United States Patent Office 3,669,633
Patented June 13, 1972

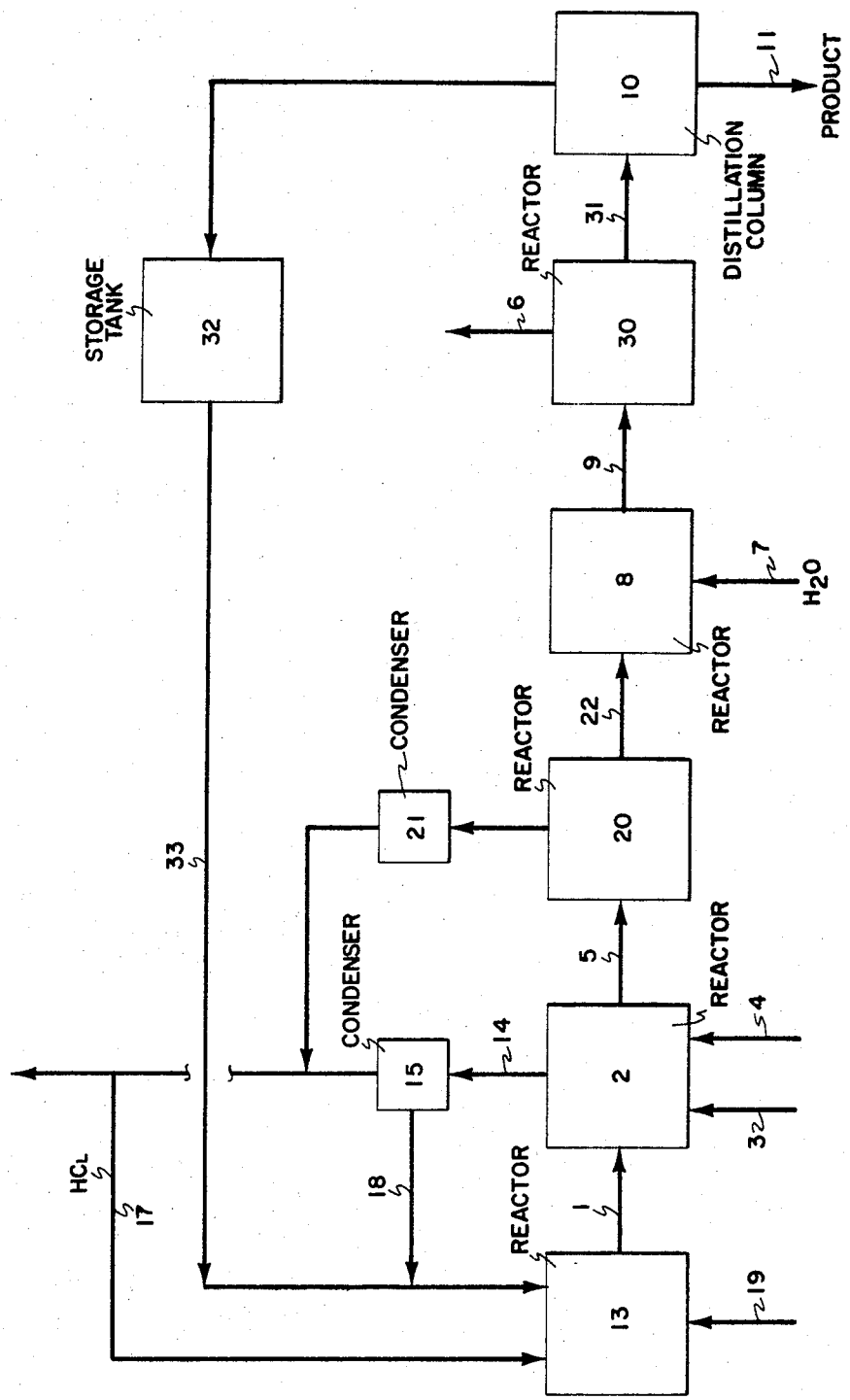

---

3,669,633
CONTINUOUS PROCESS FOR THE PREPARATION OF PHOSPHONITRILIC CHLORIDE CYCLIC POLYMERS
Sidney Beinfest, Berkeley Heights, Zenon Jacura, North Plainfield, and Phillip Adams, Murray Hill, N.J., assignors to Millmaster Onyx Corporation, New York, N.Y.
Filed Aug. 19, 1970, Ser. No. 65,074
Int. Cl. C01b *21/00, 25/00*
U.S. Cl. 23—357　　　　　　　　　　　7 Claims

ABSTRACT OF THE DISCLOSURE

In the production of phosphonitrilic chloride cyclic polymers by the reaction of ammonium chloride with $PCl_5$, substantial improvements are obtained by injection of $PCl_3$ and $Cl_2$ into the reaction zone to form the $PCl_5$; treating phosphonitrilic chloride polymers contained in an inert organic solvent with water to segregate a major portion of the linear polymers to an aqueous phase and a major portion of the cyclic polymers to an organic solvent phase; and incorporating these improvements further into a continuous method.

BACKGROUND OF THE INVENTION

Field of the invention

Phosphonitrilic chloride polymer derivatives are in demand because of their elastic, fire-resistant, and heat-resistant qualities for coating applications. The cyclic polymers are found to be particularly useful and thus economic processes for obtaining them and for maximizing their production are extremely desirable.

Description of the prior art

The preparation of phosphonitrilic chloride polymers by the reaction of $PCl_5$ with ammonium chloride in an inert solvent is well known. It is also well known that it is desirable to have the ammonium chloride present in relatively fine particle size. Problems have arisen in obtaining the cyclic polymers relatively free of the linear ones.

SUMMARY OF THE INVENTION

It has now been found that during the production of phosphonitrilic chloride cyclic polymers by reaction of ammonium chloride with $PCl_5$ in a reaction zone, and recovering the polymers from the reaction system, greatly improved results are obtained by injecting $PCl_3$ and $Cl_2$ into the reaction zone to form the requisite $PCl_5$; treating the resultant phosphonitrilic chloride polymers, contained in an inert organic solvent, with water to segregate a major portion of the linear polymers to an aqueous phase and a major portion of the cyclic polymers to an organic solvent phase, and ideally incorporating these improvements into a continuous method of producing the desired products.

It is indeed surprising that the improved results of this invention are obtained.

Thus it would have been expected that the ammonium chloride would react with the $Cl_2$ and/or $PCl_3$ at least in part to prevent formation of the desired reaction system. Also unexpected is the surprising selectivity of the integrated system and the fact that the reactive components can be recycled in the continuous operation.

BRIEF DESCRIPTION OF THE DRAWING

Referring now to the flow diagram, ammonium chloride slurry in an inert organic solvent is injected through line 1 into reactor 2. $PCl_3$ is injected through line 3 and $Cl_2$ through line 4.

The resulting phosphonitrilic chloride polymers which are in solution in the organic solvent are removed through line 5 to finishing reactor 20 where heating is continued. Reaction product is taken through line 22 to reactor 8. Water is injected through line 7 and mixed with reaction product. The water treated system is taken through line 9 to reactor 30 where phase separation takes place. An aqueous phase containing a major portion of the linear polymer and an organic phase containing a major portion of the cyclic polymer are formed. The upper aqueous phase is withdrawn through line 6 and can be discarded.

The cyclic polymer contained in the solvent is withdrawn through line 31 to distillation column 10. The organic solvent is distilled off through line 12 and product recovered through line 11.

The solvent from line 12 is sent to storage tank 32 for reuse in the continuous system conveniently through line 33 to reactor 13.

Adverting again to reactor 2, gaseous HCl and some organic solvent are taken overhead through line 14 and sent to condenser 15. The condenser splits this overhead into an HCl fraction which exits through line 16, and a solvent fraction which can be recycled through line 18 to reactor 13. A portion of the evolved HCl is recycled through line 17 to reactor 13 so that ammonium chloride can be formed therein with ammonia from line 19 and the cycle is completed through line 1.

DISCUSSION OF PREFERRED EMBODIMENTS

The ammonium chloride utilized in the reaction can be used as received, but is preferably ground to fine particle size such as by known mechanical means or formed in situ. Additionally, ammonium chloride particles can be provided in extremely fine form by other means such as the technique of German Pat. 354,078 of 1922.

The ammonium chloride is slurried in an inert solvent for phosphonitrilic chloride polymers. Inert inorganic solvents can be used. Inert oxygenated and chlorinated organic solvents typically are also suitable. The solvent boiling point should be sufficiently low that the solvent may be removed afterwards from the crude phosphonitrilic cyclic polymer without further polymerization. The solvents are such that alone or with the phosphonitrilic chloride polymers in the reaction system, they have a boiling point in the range of 110–200° C. It is preferred to use monochlorobenzene as the solvent in the invention, although other chlorinated hydrocarbon solvents or phosphorus oxychloride may be used. Among the other satisfactory solvents are trichlorobenzenes, orthodichlorobenzene, sym-tetrachloroethane and tetrachloroethylene. Monochlorobenzene is a preferred solvent since it offers a comparatively low boiling point, is economical, less toxic than tetrachloroethane and readily available. Phosphonitrilic chloride polymers $(PNCl_2)_x$ themselves are useful solvents.

$PCl_3$ and $Cl_2$ are preferably injected into the reaction zone to form the $PCl_5$ reactant. The $Cl_2$ is utilized in at least an equimolar amount or slight excess based on $PCl_3$.

A temperature in the range of about 110 to 200° C., preferably in the range of about 130 to 150° C., is utilized in the reaction to produce the cyclic polymers.

Further improvement in our invention involves the treatment of the phosphonitrilic chloride polymers contained in an inert organic solvent with water so that a major portion of the linear polymers are segregated to an aqueous phase and a major portion of the cyclic polymers are segregated to an organic solvent phase. Thus at least 80 wt. percent of the cyclic polymers are found in the organic phase with no more than 5 wt. percent the linear polymers produced. The water is utilized in the treatment in an amount of at least about 2.5 parts by weight per one part linear polymer produced in the system.

The water treatment is conveniently conducted at a temperature of 75° C. to the boiling point of water in the system, approximately 100° C.

It is necessary that the phosphonitrilic chloride polymers be contained in an inert organic solvent, i.e., such as those listed previously. Thus where an inorganic solvent such as $(PNCl_2)_x$ has been used in the reaction, rather than an inert organic one, the latter has to be added prior to the water treatment. The desired cyclic products are then recovered by separating the organic solvent therefrom, conveniently by distillation.

The above indicated improvements thus lend themselves to further incorporation into an improved continuous process. This process comprises preferably the steps of:

(1) Reacting ammonium chloride with $PCl_5$ in an inert organic solvent for the polymers in a reaction zone;

(2) Treating the resultant phosphonitrilic chloride polymers in the organic solvent with the water to obtain the segregation indicated;

(3) Separating the aqueous phase from the organic solvent phase;

(4) Separating the organic solvent from the cyclic polymers to yield the latter as a product; and (5) Recycling at least a portion of the organic solvent for use in the process.

Further improvements are obtained by recovering at least a portion of the HCl evolved from the reaction zone of step (1) and reacting the recovered HCl with ammonia in recycled solvent and utilizing the resultant ammonium chloride contained in the organic solvent for the reaction of step (1).

This invention, product work-up, and advantages will be better understood by reference to the following example.

EXAMPLE 1

Into a three-necked flask, with a stirrer, condenser, addition arrangement and effluent gas scrubber, to a slurry of 766 g. $NH_4Cl$ in 3.4 l. monochlorobenzene were added simultaneously 1730 g. $PCl_3$ and an excess of $Cl_2$ over 10.7 hours at a pot temperature of 130° C. The mixture was refluxed 2.3 hours until HCl evolution ceased. Analysis showed that the cyclic fraction was composed of 80.4% trimer, 13% tetramer and 6.5% higher cyclics. The reaction mixture was added over one hour to 770 ml. $H_2O$ at reflux. The layers were separated and the cold organic layer was washed with water, dilute $NaHCO_3$ and water.

1252 gms. of cyclic polymer were recovered (86% yield). Analysis showed the material to be 99.8% cyclic, or practically free of linear polymer.

This example demonstrates the obtaining of excellent yields of linear polymer free product by the process of this invention.

The advantages of this invention will be apparent to the skilled in the art. High yields of cyclic polymer, free of linear contamination are efficiently obtained. Other advantages will be readily apparent.

It is to be understood that this invention is not limited to the specific example with has been offered merely as illustration, and that modifications can be made without departing from the spirit thereof.

What is claimed is:

1. A continuous method of producing and recovering phosphonitrilic chloride cyclic polymers which comprises the steps of:

(1) reacting ammonium chloride with $PCl_5$ in an inert organic solvent for the polymers in a reaction zone, the $PCl_5$ being formed by injecting $PCl_3$ and $Cl_2$ into the reaction zone;

(2) treating the resultant phosphonitrilic chloride polymers in the organic solvent at a temperature in the range of 75–100° C. with water so that a major portion of the linear polymers formed are segregated to an aqueous phase and a major portion of the cyclic polymers are segregated to an organic solvent phase, the water being utilized in an amount of at least about 2.5 parts by weight per one part of linear polymers;

(3) separating the aqueous phase from the organic solvent phase;

(4) separating the organic solvent from the cyclic polymers so as to provide the latter as a product; and (5) recycling at least a portion of the organic solvent for reuse in the process.

2. The method of claim 1 in which the $Cl_2$ is utilized in at least an equimolar amount based on $PCl_3$.

3. The method of claim 1 including the additional steps of recovering at least a portion of the HCl evolved from the reaction zone of step (1); reacting the recovered HCl with ammonia in at least a portion of the recycle solvent from step (5); and sending the resultant ammonium chloride contained in the organic solvent to the reaction zone of step (1).

4. The method of claim 1 in which a temperature in the range of 110° to 200° C. is utilized in step (1).

5. In a method producing phosphonitrilic chloride cyclic polymers by reaction of ammonium chloride with $PCl_5$, in a reaction zone, and recovering the cyclic polymers from the reaction system, the improvement which comprises:

(1) treating the resultant phosphonitrilic chloride polymers in an organic solvent at a temperature in the range of 75–100° C. with water so that a major portion of the linear polymers formed are segregated to an aqueous phase and a major portion of the cyclic polymers are segregated to an organic solvent phase;

(2) separating the aqueous phase from the organic solvent phase; and (3) recovering the organic phase containing the major portion of the cyclic polymers.

6. The method of claim 5 in which the water is utilized in an amount of at least about 2.5 parts by weight per one part linear polymer.

7. The method of claim 5 in which the solvent is monochlorobenzene.

References Cited

UNITED STATES PATENTS

| | | | |
|---|---|---|---|
| 2,862,799 | 12/1958 | Dittmar et al. | 23—357 X |
| 3,359,080 | 12/1967 | Ridgway et al. | 23—357 |
| 3,367,750 | 2/1968 | Jaszka et al. | 23—357 |
| 3,299,001 | 1/1967 | Kaplan | 23—312 ORG |

OTHER REFERENCES

Emeleus et al., "Advances in Inorganic Chemistry and Radiochemistry," vol. 1, pp. 351, 352, 359, 360 (1959).

MILTON WEISSMAN, Primary Examiner

U.S. Cl. X.R.

23—312